United States Patent [19]

Takada

[11] Patent Number: 4,483,494
[45] Date of Patent: Nov. 20, 1984

[54] SEAT BELT RETRACTOR

[76] Inventor: Juichiro Takada, 12-1, 3 chome, Shinmachi, Setagaya-ku, Tokyo, Japan

[21] Appl. No.: 502,765

[22] Filed: Jun. 9, 1983

[30] Foreign Application Priority Data

Jun. 9, 1982 [JP] Japan .............................. 57-084778[U]

[51] Int. Cl.³ ...................... A62B 35/00; B65H 75/48
[52] U.S. Cl. ............................... 242/107; 242/107.4 R
[58] Field of Search ...................... 242/107, 107.4 R; 280/803, 806–808; 297/475–480

[56] References Cited

U.S. PATENT DOCUMENTS

| 4,088,281 | 5/1978 | Close | 242/107 |
| 4,113,062 | 9/1978 | Beland | 242/107 X |
| 4,301,977 | 11/1981 | Yang | 242/107 |
| 4,382,563 | 5/1983 | Morita et al. | 242/107 |

*Primary Examiner*—John M. Jillions
*Attorney, Agent, or Firm*—Brumbaugh, Graves, Donohue & Raymond

[57] ABSTRACT

The winding mechanism of a seat belt retractor includes a planetary gear train between the winding spring and the belt reel shaft, whereby the tensile force acting on the belt when it is done up is low and the belt is more comfortable to the wearer.

1 Claim, 3 Drawing Figures

SEAT BELT RETRACTOR

FIELD OF THE INVENTION

This invention relates to seat belt retractors of the type used in the occupant safety restraint belt systems of automobiles and other motor vehicles and, in particular, to the belt-winding mechanisms of seat belt retractors.

BACKGROUND OF THE INVENTION

Almost all seat belt systems in cars and other motor vehicles made in the past several years have belt retractors that wind up part or all of the belt when it is not in use so that the belt is kept out of the way, rather than lying around and cluttering up the passenger compartment, and is conveniently ready to be put on when needed. The retractor also protects the belt from wear and possible damage when it is not in use.

Although there are belt retractors that are designed to stay loosely in place (not under tension) on the user, it is very common for the winding force to be always present, which means that the belt is pulled fairly firmly against the user's lap or torso or both at all times. The pressure of the belt against the wearer is often bothersome, and there is reason to think that many people prefer not to use seat belts because of the constant pull of the belt against their body.

SUMMARY OF THE INVENTION

There is provided, in accordance with the present invention, a belt retractor having a winding mechanism that imparts only a comparatively small restraining pressure on the user's body. Like almost all retractors the invention has a belt reel affixed to a shaft that is journaled in a frame and is urged to rotate in the belt-winding direction by a winding mechanism, the driving element of which is a spiral winding spring.

The invention is characterized in that the winding mechanism comprises a planetary gear train including a sun gear on the reel shaft, a planet gear carrier rotatably carried on the shaft, a first planet gear rotatably supported on the carrier and meshing with the sun gear, a second planet gear rotatably supported on the carrier and meshing with the first planet gear and an internal gear rotatably supported and meshing with the second planet gear and coupled to the winding spring so that it is biased to drive the sun gear through the planet gears in the beltwinding direction. An auxiliary spring is coupled between the internal gear and the planet carrier so that the planet carrier is biased to rotate, relative to the internal gear, in the belt-winding direction. There is a circular row of ratchet teeth on the planet carrier that are located concentrically to the reel shaft and face against the belt-winding direction. A mechanism is provided for selectively engaging a ratchet tooth on the carrier to stop rotation of the carrier in the belt-winding direction, whereupon the planetary gear train transmits a torque to the reel shaft that is substantially less than the torque exerted by the winding spring on the internal gear.

The technical advance provided by the present invention is that the pressure of the belt against the body of the person wearing the belt due to tension exerted on the belt by the winding mechanism of the retractor is considerably less than it would be if the winding spring were acting directly on the belt reel. Such reduction in the pressure of the belt is due to the planetary gear mechanism, which considerably attenuates the torque acting on the reel shaft when the belt is done up and the planet carrier is locked against rotation.

For a better understanding of the invention, reference may be made to the following description of an exemplary embodiment, taken in conjunction with the accompanying drawings.

DESCRIPTION OF THE EMBODIMENT

Figure 1:
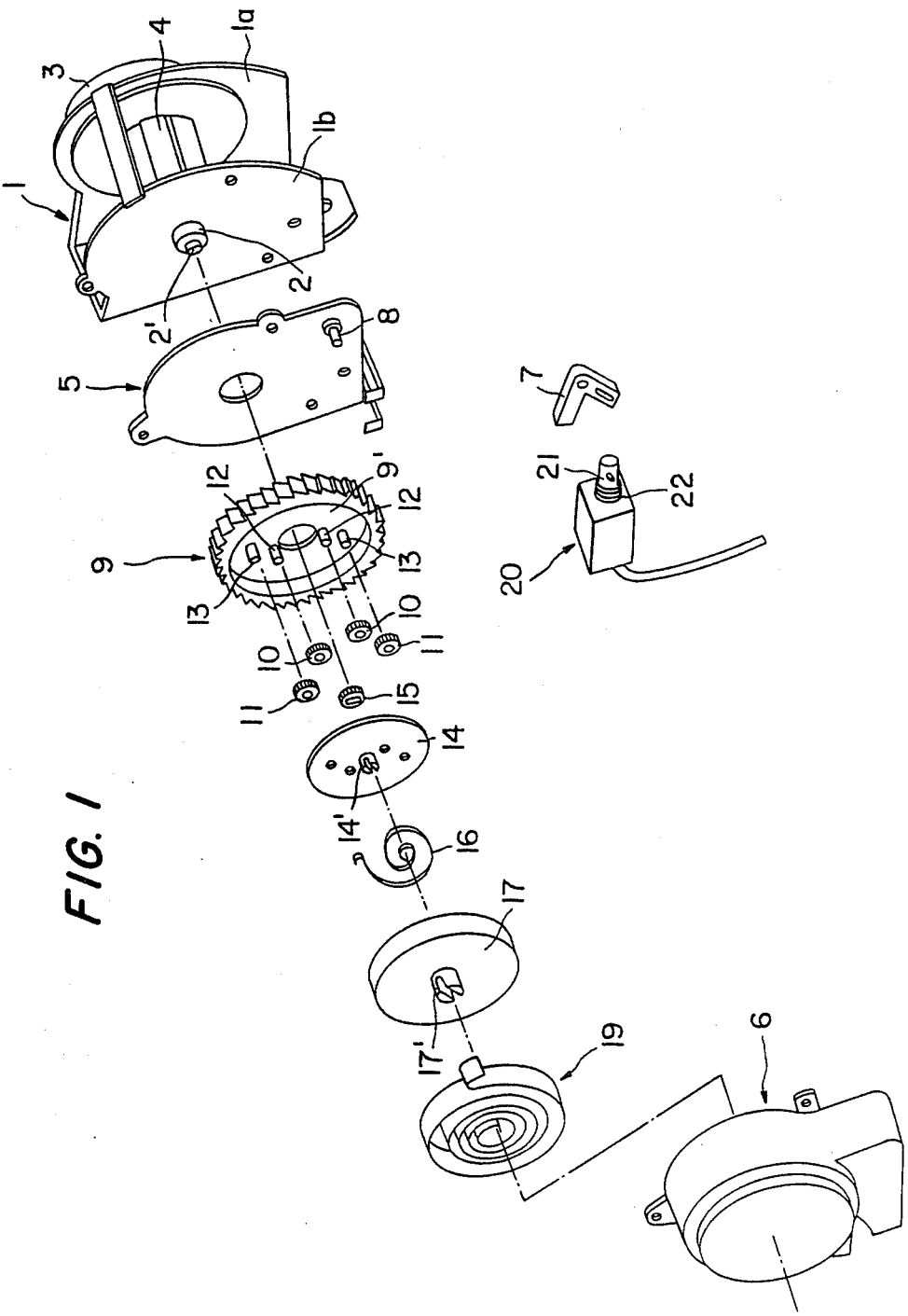
FIG. 1 is an exploded pictorial view of the embodiment.

The retractor comprises a U-shaped frame 1 having side members 1a and 1b that rotatably support a belt reel shaft 2. A belt reel 4 is affixed to the shaft and rotates with it. Reference numeral 3 in FIG. 1 represents generally an emergency locking mechanism associated with the reel shaft, which mechanism may be of any suitable type, many of which are well known to those skilled in the art.

Figure 2:
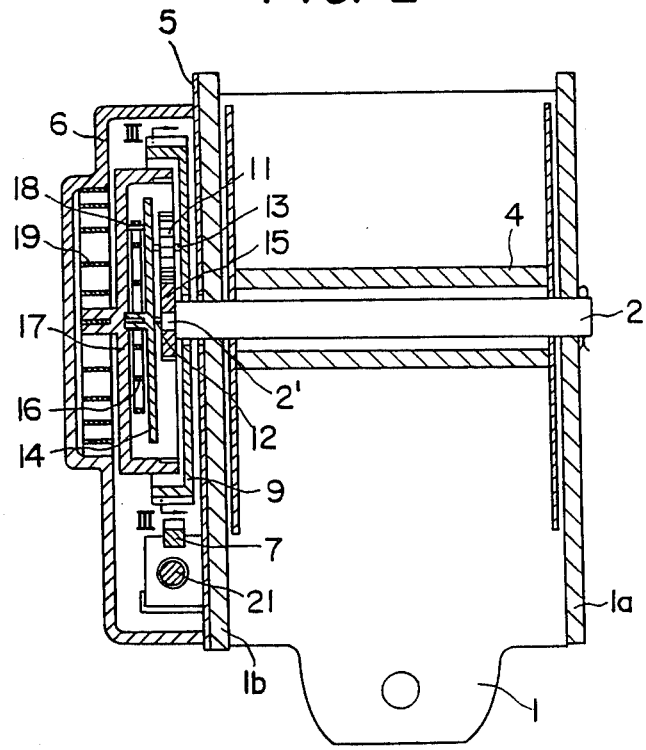
FIG. 2 is a cross-sectional view of the embodiment taken generally along the axis of the reel shaft in a plane generally parallel to the plane of the base of the reel frame.

The winding mechanism, according to the embodiment shown in the drawings, is enclosed within a casing comprising a retainer plate 5 and a cover 6 affixed to the side member 1b. The retainer plate has a pin 8 that rotatably carries a lever 7, the purpose of which will be described in greater detail below. Immediately outboard of the retainer plate 5 is a ratchet wheel 9, which has a circular row of ratchet teeth arranged concentrically to the axis of the shaft 2 and facing in the belt-winding direction. The ratchet wheel 9 actually forms part of a carrier for the planet gears of a planetary gear train. Accordingly, the ratchet wheel 9 has a pair of mounting pins 12 for a first pair of planet gears 10 and a second pair of pins 13 for a second pair of planet gears 11. The inner gears 10 mesh with a sun gear 15 that is affixed on a reduced diameter portion 2' of the reel shaft. The outer planet gears 11 mesh with the inner planet gears 10 and also mesh with an internal gear 17. A carrier disk 14 lies outboard of the planet gears and rotates with the ratchet wheel as a unit by virtue of reception of the pins 12 and 13 in holes in the carrier disk 14. As may be best be seen in FIG. 2, the internal gear 17 is a cup-like disk having the gear teeth along the interior edge of circumferential flange that nests within a recess 9' of the ratchet wheel 9.

The planet carrier, which comprises the disk 14 and the ratchet wheel 9, is freely rotatable on the reel shaft 2. An auxiliary spring 16, one end of which is coupled to a slot 14' in a central boss on the carrier disk 14 and the other end of which is coupled to a pin 18 (see FIG. 2) on the internal gear 17, limits rotation of the planet gear carrier relative to the internal gear, the limits being the fully wound up and fully unwound configurations of the auxiliary spring. The internal gear 17 is urged in a direction to apply a winding rotation to the reel 4 through the planetary gear train by a main winding spring 19, one end of which is connected to a boss 17' on the internal gear 17 and the other end of which is connected to an element (not shown) in the case 6. The belt winding force is stored in the spring when the belt is withdrawn from the retractor, and the winding force of the spring is recovered when the belt is rewound onto the reel 4.

As will be apparent more readily from the following description of the operation of the mechanism, the operation of the planetary gear mechanism is under the control of an electrical solenoid 20, the pole piece 21 of which is normally urged outwardly by a spring 22 but which is retracted upon energization of the solenoid coil. The pole piece 21 is coupled by a pin and slide way to the lever 7. The energization of the solenoid 20, in turn, is under the control of a switch that is built into the seat belt buckle or the seat associated with the belt or the vehicle door. Switches in these locations are indicative of the utilization of the safety belt by a vehicle occupant. The most direct indication of the use of the belt is, of course, when the buckle is done up, and the buckle is the preferred location for the switch that operates the lever 7.

Figure 3:
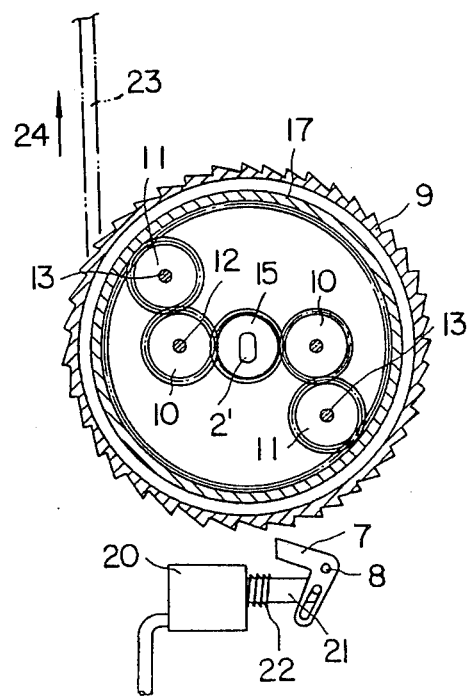
FIG. 3 is a side cross-sectional view of the belt-winding mechanism taken generally along the lines 3—3 of FIG. 2 and in the direction of the arrows, namely along a plane located just outside of the gears of the planetary gear train.

When the belt 23 (FIG. 3) is undone and is fully wound onto the retractor reel 4, the main winding spring 19 is unwound, and the auxiliary spring 16 is fully wound up. The solenoid is deenergized, and the lever 7 is retracted clear of the ratchet teeth on the ratchet wheel 9. When the user pulls the belt out, as indicated by the arrowed line 24 in FIG. 3, the shaft 2 is rotated clockwise. Because the auxiliary spring 16 is fully tightened, rotation of the planet gear carrier relative to the internal gear is not possible, and the planetary gear train does not act as a gear train but instead is locked. Hence, clockwise rotation of the shaft 2 as the belt is pulled out produces corresponding clockwise rotation of the internal gear 17, thus storing energy in the main belt-winding spring 9 as it tightens.

When the buckle tongue on the end of the belt is inserted into the buckle to do up the belt, the switch in the buckle completes an electrical circuit to the solenoid, thereby energizing the solenoid coil and retracting the pole piece 21 against the bias of the spring 22 and pivoting the lever 7 into a position which the tip engages one of the ratchet teeth on the perimeter of the ratchet wheel 9. Such engagement of the ratchet wheel locks the planet carrier against rotation. Whatever slack is then in the seat belt is quickly taken up by recovery of some of the energy of the main winding spring 19, which urges the internal gear to rotate counterclockwise. Counterclockwise rotation of the internal gear drives the outer planet gears 11 counterclockwise and the inner planet gears 10 clockwise. The inner gears, in turn, drive the sun gear 15 counterclockwise, thereby rotating the reel shaft 2 and the reel 4 in the counterclockwise or winding direction. The reel shaft is rotated counterclockwise at a relatively high velocity, but with a comparatively low torque. Accordingly, the tension applied to the belt 23 is low, as compared to what it would be if the main spring 19 were driving the belt reel directly. With the carrier latched by the solenoidally actuated lever 7 through the ratchet ring, the planet gear train functions as a torque reducer, whereby only a relatively light tensile force is applied to the belt and the belt bears against the body of the vehicle occupant with a relatively low force.

With the belt done up and the carrier locked by the lever 7, the rewinding of the spring and corresponding counterclockwise rotation of the internal gear 17 relative to the carrier disk 14 produces unwinding of the auxiliary spring. Accordingly, should the occupant want to lean forward in the vehicle against the belt, the unwinding of the belt from the reel and the corresponding clockwise rotation of the shaft and the sun gear works through the planet gears to produce a small amount of counterclockwise rotation of the internal gear, such rotation of the internal gear being afforded without locking of the planetary gear train by complete tightening of the auxiliary spring. The length of the auxiliary spring will determine how much belt unwinding can occur before the planetary gear train becomes locked up by full tightening of the spring. If the auxiliary becomes fully wound up, thereby causing the planetary gear train to lock up, the ratchet wheel 9 will be permitted to rotate clockwise, inasmuch as the solenoid 20 will permit the lever 7 to retract and allow the ratchet teeth to slide one by one past the lever. When the person using the belt leans back again the main spring 19 will rotate the ring gear 17 counterclockwise and drive the planetary gear train in a direction to rotate the reel shaft 2 in the counterclockwise direction and thereby rewind the belt 23 onto the reel 4 still with a low force.

When the occupant releases the buckle tongue from the buckle, the buckle switch opens, thereby deenergizing the solenoid 20, whereupon the spring 22 pushes the pole piece 21 out and dislodges the lever 7 from the ratchet teeth of the ratchet wheel 9. The main winding spring 19 rotates the ring gear 17 counterclockwise. The carrier 9-14 will orbit counterclockwise around the sun gear 15 until the auxiliary spring 16 is fully wound. Meanwhile, the sun gear and shaft remain stationary. As soon as the spring 16 is fully wound, the planet carrier can no longer orbit around the sun gear and instead becomes locked, whereupon the planetary gear train in its entirety is driven in counterclockwise rotation by the spring 19. Accordingly, the belt 23 is fully wound onto the retractor reel, where it remains until an occupant again pulls it out to do it up.

Thus, there is provided, in accordance with the present invention, a belt retractor having an improved belt-winding mechanism that provides for a substantial reduction in the pressure of the belt against the wearer due to the torque reduction afforded by planetary gear train. The belt is thus more comfortable to the user, and he or she will be encouraged to use the belt system because of this greater comfort. Similarly, the user is better able to move forward against the pressure of the belt, inasmuch as force resisting the user's forward movement is likewise reduced, as compared to what it would be if the belt-winding spring were acting directly on the belt reel at all times.

I claim:

1. A seat belt retractor having a belt reel shaft rotatably carried by a frame and a winding mechanism coupled to the reel shaft and including a spiral winding spring adapted to urge the reel shaft to rotate in a direction to wind the belt onto the reel, characterized in that the winding mechanism comprises a planetary gear train including a sun gear on the reel shaft, a planet gear carrier rotatably carried on the shaft, a first planet gear rotatably supported on the carrier and meshing with the sun gear, a second planet gear rotatably supported on the carrier and meshing with the first planet gear, and an internal gear rotatably supported in mesh with the second planet gear and coupled to the winding spring such that it is biased to drive the sun gear through the planet gears in the belt-winding direction; an auxiliary spring coupled between the internal gear and the planet carrier such that the planet carrier is biased to rotate relative to the internal gear in the belt-winding direction; a circular row of ratchet teeth on the planet carrier located concentrically to the reel shaft and facing against the belt-winding direction; and means selectively engageable with a ratchet tooth on the carrier to stop rotation of the carrier in the belt-winding direction, whereby the planetary gear train transmits a torque to the reel shaft that is substantially less than the torque transmitted by the winding spring to the internal gear when a ratchet tooth is so engaged.

* * * * *